Jan. 6, 1970 M. A. ROSENBLAT 3,488,601
REVERSIBLE MAGNETIC AMPLIFIER
Filed Aug. 28, 1967
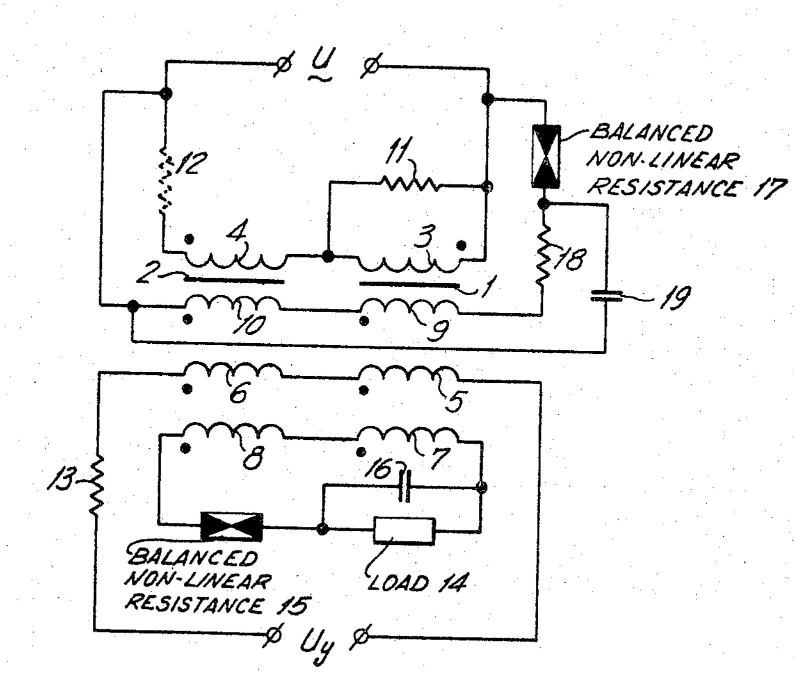

United States Patent Office 3,488,601

Patented Jan. 6, 1970

3,488,601

REVERSIBLE MAGNETIC AMPLIFIER

Moisei Aronovich Rosenblat, Ulitsa Fersmana 3, kv. 76, Moscow, U.S.S.R.

Filed Aug. 28, 1967, Ser. No. 663,685
Int. Cl. H03f 9/00
U.S. Cl. 330—8 2 Claims

ABSTRACT OF THE DISCLOSURE

A magnetic amplifier with a reversible D.-C. output obtained by rectifying the double-frequency voltage induced in the output windings by aid of a symmetrical nonlinear resistor has a high zero-stability obtained by eliminating the influence of the even harmonic of the supply voltage by passing a direct current proportional to these harmonics through corresponding compensation windings of the amplifier.

This invention relates to magnetic amplifiers and more particularly, to reversible magnetic amplifiers with a phase-sensitive rectifier of even harmonics which are induced when a signal is applied to the amplifier input.

Known reversible magnetic amplifiers incorporate a balanced nonlinear resistance which is a phase-sensitive rectifier of double frequency voltage induced in the output windings of the magnetic amplifier cores. Nonlinear resistances may be constituted by carborundum resistors (thyrites), two diodes connected in parallel opposition, or a rectifier bridge with either a D.C. source or with an R.C. network or a silicon stabilotron (Zener diode) connected across the corners thereof.

For ample rectification of the even harmonics of the voltage induced in the output windings, the first harmonic is applied to the rectifier circuit, obtained, for example, by connecting a resistance across one of the magnetic amplifier supply windings. A high value resistance or inductance for double frequency voltage is series-connected with the input windings.

A principal drawback of the above amplifier is the appearance of output stray voltage due to the presence of even harmonics in the voltage. Any variation of the amplitude or phase of these harmonics causes the amplifier null to drift.

It is an object of the invention to eliminate amplifier null drift caused by the presence of even harmonics in the supply voltage.

With the above object in view the reversible magnetic amplifier of this invention comprises at least two cores of high $\mu$ material; at least one input winding placed on said cores and connected to the input signal source; at least one output winding placed on said cores and operating into an output load; a capacitor coupled in parallel with the load and adapted for smoothing the rectified output current; at least one balanced nonlinear resistance constituted by a phase-sensitive double frequency rectifier, series-connected with said output winding; at least two supply windings placed on said cores and connected to the supply source; at least one resistor parallel-connected with one of said supply windings and adapted for obtaining fundamental frequency voltage in the output circuit of the magnetic amplifier; at least one compensating winding placed on said cores and connected to the supply source; at least one additional balanced nonlinear resistance, series-connected with said compensating windings, said resistance being a phase-sensitive rectifier of supply voltage even harmonics.

Additionally, to achieve adequate compensation for the effect of the even harmonics of the supply voltage, provision is made for an adjustable resistance, series-connected with the additional balanced nonlinear resistance, while the effect of even harmonics induced in the compensating windings is compensated by a capacitor placed in parallel with said compensating windings and said adjustable resistance.

Other objects and advantages of the invention will appear in the following description taken with the accompanying drawing wherein is illustrated the electric circuit diagram of the reversible magnetic amplifier.

The magnetic amplifier incorporates two identical cores 1, 2 manufactured from high $\mu$ material. Cores 1, 2 accommodate supply windings 3, 4, input windings 5, 6, output windings 7, 8 and compensating windings 9, 10. In the drawing the in-end of each winding is designated with a dot. To obtain a fundamental frequency voltage in the amplifier output circuit, supply winding 3 is shunted with resistance 11. To enable limiting of current in windings 3, 4 when the magnetic amplifier is fed with D.C. voltage, a resistance 12 is connected in series with said windings 3, 4. Series-connected with input windings 5, 6 is a high-value resistance or inductance 13. Alternatively said windings 5, 6 may be series-connected with filters intended for limiting the even harmonics of the winding currents.

Load 14 is coupled to the terminals of series-connected output windings 7, 8 via nonlinear resistance 15 which has a symmetric (odd) volt-ampere characteristic. Capacitor 16 placed in parallel with load 14 is designed for smoothing rectified current flowing through load 14. To generate compensating signals dependent on the amplitude and phase of the supply voltage even harmonics, an additional balanced nonlinear resistance 17, which has a symmetric volt-ampere characteristic, is connected in series with linear resistance 18 and compensating windings 9, 10 to the supply source terminals. The compensating current is controlled by linear resistance 18. Capacitor 19 connected across linear resistance 18 and compensating windings 9, 10 prevents rectification of the even harmonics induced in compensating windings 9, 10 by additional nonlinear balanced resistance 17 and also eliminates ripple in the rectified compensating current.

Resistance 11 connected across supply winding 3 causes fundamental frequency electromotive force to be induced in output windings 7, 8. However, when the supply voltage signal contains no even harmonics and no signal appears at the amplifier input the amplifier output is not rectified.

When a signal is applied to the amplifier input, both the first harmonic and the even harmonics are induced in amplifier output windings 7, 8, said harmonics being rectified by balanced nonlinear resistance 15.

The rectified current flows through load 14. If the supply voltage contains even harmonics, these are also partly transformed to output windings 7, 8 and rectified, thus causing the amplifier to deliver a stray output.

Additional balanced nonlinear resistance 17 rectifies the even harmonics of the supply voltage, and its rectified output is delivered to compensating windings 9, 10 to offset the effect of the even harmonics transformed directly from the supply circuit to output windings 7, 8. This makes it possible to eliminate to a considerable degree the effect of the even harmonics of the supply voltage and fluctuations thereof on the amplifier null stability, which appreciably improves its lower sensitivity threshold and permits its use for the amplification of weaker signals.

In describing the preferred embodiment of the present invention illustrated in the drawing, specific terminology was resorted to for the sake of clarity. However, the invention is not intended to be limited to the specific terms so selected, and it is to be understood that each specific term includes all technical equivalents which operate in a similar manner to accomplish a similar purpose. Although the invention is described in connection with a preferred embodiment it is clear that various changes and modifications may be made without departing from the spirit and scope of the present invention which will be easily understood by those skilled in the art.

What is claimed is:

1. A reversible magnetic amplifier comprising at least two cores manufactured from high $\mu$ material; at least one input winding placed on said cores and connected to the input signal source; at least one output winding placed on said cores and operating into an output load; a capacitor coupled in parallel with the load for smoothing the recified load current; a balanced nonlinear resistance which is a phase-sensitive double frequency rectifier series-connected with said output winding; at least two supply windings placed on said cores and connected to a supply source; at least one resistance parallel-connected with one of said supply windings for obtaining fundamental frequency voltage in the output circuit of the magnetic amplifier; at least one compensating winding placed on said cores and connected to the supply source; and at least one additional balanced nonlinear resistance series-connected with said compensating windings, which is a phase-sensitive rectifier of supply voltage even harmonics in the supply voltage.

2. A reversible magnetic amplifier comprising at least two cores manufactured from high $\mu$ material; at least one input winding placed on said cores and connected to the input signal source; at least one output winding placed on said cores and operating into a load; a capacitor coupled in parallel with the load for smoothing the rectified load current; a balanced nonlinear resistance which is a phase-sensitive double frequency rectifier series-connected with said output winding; at least two supply windings placed on said cores and connected to the supply source; at least one resistance parallel-connected with one of said supply windings for obtaining fundamental frequency voltage in the output circuit of the magnetic amplifier; at least one compensating winding placed on said cores and connected to the supply source; at least one additional balanced nonlinear resistance which is a phase-sensitive rectifier of even harmonics in the supply voltage; an adjustable resistance, series-connected with said additional balanced nonlinear resistance and providing adequate compensation for the effect of even harmonics in the supply voltage, said additional balanced nonlinear resistance and adjustable resistance being connected to the supply source via compensating windings; and a capacitor placed in parallel with said compensating windings and connected to the supply source, said capacitor being adapted for neutralizing the effect of even harmonics induced in said compensating windings.

References Cited

UNITED STATES PATENTS

| | | | |
|---|---|---|---|
| 2,247,983 | 7/1941 | Barth | 323—89 X |
| 3,351,851 | 11/1967 | Darling | 330—8X |

NATHAN KAUFMAN, Primary Examiner

U.S. Cl. X.R.

179—170; 323—89; 330—63